Sept. 20, 1960 R. T. BURNETT 2,953,220
BRAKE
Filed Nov. 4, 1954 2 Sheets-Sheet 1

INVENTOR.
RICHARD T. BURNETT
BY John A. Young
ATTORNEY

Sept. 20, 1960     R. T. BURNETT     2,953,220
BRAKE

Filed Nov. 4, 1954     2 Sheets-Sheet 2

INVENTOR.
RICHARD T. BURNETT
BY John A. Young
ATTORNEY ns Patent Office 2,953,220
Patented Sept. 20, 1960

2,953,220

BRAKE

Richard T. Burnett, South Bend, Ind., assignor to The Bendix Corporation, a corporation of Delaware Filed Nov. 4, 1954, Ser. No. 466,861

9 Claims. (Cl. 188—70)

This invention relates to an auxiliary brake applying means and more particularly to a mechanically applied friction device adapted for use with a composite disk and shoe brake.

An object of this invention is to obtain auxiliary brake applying means utilizable with rear wheel brakes of a construction similar to those illustrated and claimed in my co-pending application No. 392,177, now Patent No. 2,897,921, granted August 4, 1959.

A principal object of this invention is to obtain a combination of maximum parking brake effectiveness with the lowest possible lost motion in the applying linkages.

These objects and other objects and features of the invention will appear more fully hereinafter from a consideration of the following description taken in connection with the accompanying drawings wherein a plurality of embodiments of the invention are illustrated by way of example.

Figure 1:
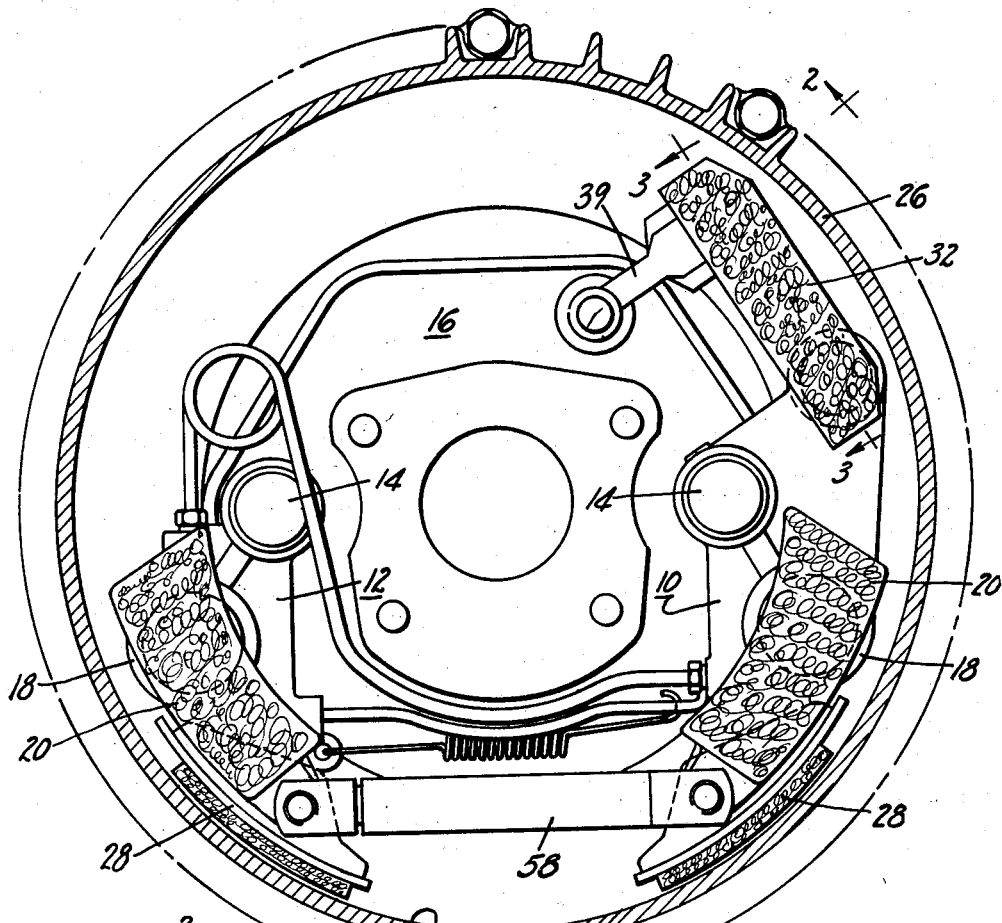
Figure 1 is a side elevation of a brake assembly with the invention incorporated therein.

This invention may be incorporated in the rear wheel brakes. The brake consists broadly of two friction units 10 and 12 which are pivotally supported on anchors 14. The anchors 14 are fastened to a torque plate 16 at opposite sides thereof.

Each of the friction units includes a fluid motor 18 which is arranged to produce spreading of friction elements 20 thereby forcibly engaging them with surfaces 22 and 24 of rotor 26. Each friction unit is further provided with a shoe element 28 engageable with surface 30 of the rotor. As will be explained more fully later in this description, application force on the shoe element 28 is derived from torque developed from engagement of the friction elements 20 with the surfaces 22 and 24 of the rotor. For further details of the rotor construction and friction unit construction refer to my copending applications No. 434,846, filed June 7, 1954, now abandoned, and No. 433,609, filed June 1, 1954, now Patent No. 2,927,664, granted March 8, 1960.

This invention is primarily concerned with auxiliary actuating means for mechanically applying the friction units 10 and 12. It is this feature which will next be explained in detail.

The auxiliary brake applying mechanism consists of a pair of oppositely applied friction members 32 and 34. These friction members are actuated by articulated levers 37 and 39 which are joined by pin 38. Lever 37 is fulcrumed at point 40 on the torque plate 16 through a ball-joint connection 42.

A flexible cable 44 is received through the ball joint connection by means of a passage 46 which is formed in the pivoted end of lever 37. The end of cable 44 is fastened to lever 39.

Figure 3:
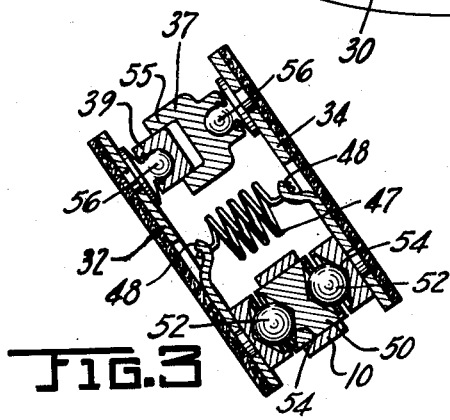
Figure 3 is a section view taken on line 3—3 of Figure 1.
Figure 2:
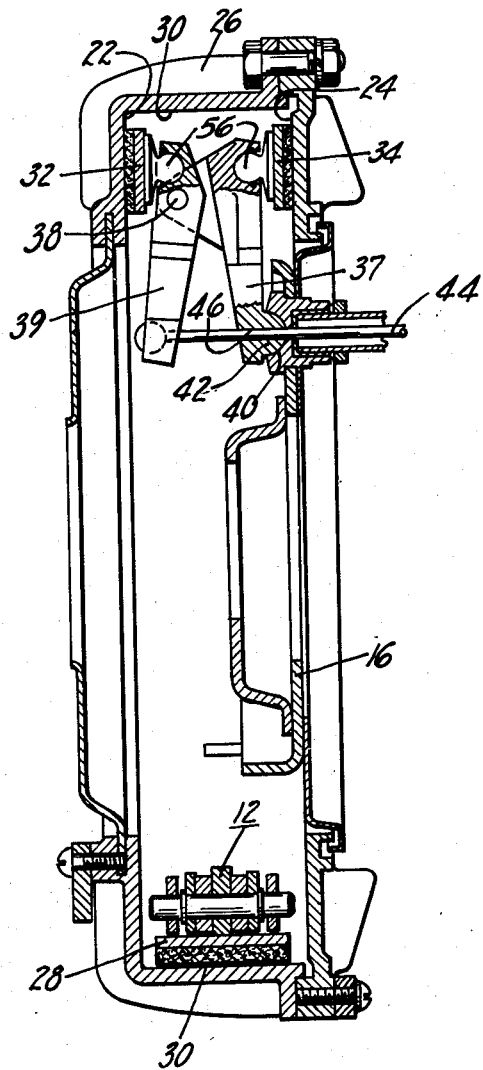
Figure 2 is a section view taken on line 2—2 of Figure 1.

A spring 47 is fastened between struck-up portions 48 in the friction members (see Fig. 3). The purpose of this spring is to maintain the friction members 32 and 34 in released position when the auxiliary brake applying mechanism is off.

The friction members 32 and 34 are connected to unit 10 through a camming device 50. The camming device assists in spreading the friction members and also imparts pivotal movement to the unit 10 when the friction members 32 and 34 shift with the rotor. The camming device 50 is formed of ball-ramp combinations 52, the ramps 54 being formed in the members 32, 34 and friction unit 10.

The levers 37 and 39 are piloted, one in the other, at the pinned connection 38. This is best seen in Figure 3. The lever 37 has bifurcations 55 which receive therebetween a portion of lever 39. The pin 38 is then inserted through the bifurcations 55 and a portion of the lever 39 to join the two levers together.

The applying ends of levers 37 and 39 are connected to the friction members 32 and 34 through ball-socket joints 56, thus permitting swivelling movement between the applying ends of the levers and the friction members 32 and 34.

The shoe elements 28 of units 10 and 12 are interconnected by means of a suitable force transmitting member 58.

The auxiliary brake is applied by pulling on the cable 44 to operate the levers 37 and 39. Pulling on the lever 39 causes it to turn on pin 38 thus exerting an applying force on the member 32 through the ball-socket joint 56. Friction member 32 is thus forcibly engaged with the surface 22 of the rotor. As the lever 39 is actuated, a reaction force is transmitted through the pin 38 to the lever 37 which is caused to turn on the ball-joint connection 42. The lever 37 thus exerts applying force on the member 34 through the ball-socket 56, forcibly engaging member 34 with surface 24 of the rotor.

Assuming that the vehicle moves in a direction causing the rotor to turn clockwise, the retarding force of members 32 and 34 on the rotor will be assisted by the shoe portion of unit 12. This is accomplished in the following manner: as the rotor moves clockwise this will produce shifting of the members 32 and 34 therewith. The articulated levers 37 and 39 turn on ball-joint 42 and swivel on the ball-sockets 56 to permit shifting movement of the friction members. Shifting of the friction members produces pivotal movement of unit 10 in a clockwise direction about anchor 14. Any movement of the members 32 and 34 relative to the unit 10 causes further spreading of the members through the camming device 50. Clockwise turning of unit 10 about anchor 14 communicates applying effort to unit 12 through the force transmitting member 58, which induces clockwise movement of the unit 12 about anchor 14 thereby engaging the shoe element 28 of unit 12 with the surface 30 of the rotor.

If the vehicle should tend to move in a direction producing counterclockwise direction of rotor movement, the friction members 32 and 34 will tend to shift therewith in a like direction. The levers 37 and 39 turn on the ball joint connection 42 in a counterclockwise direction (referring to Figure 1), and the levers 37 and 39 swivel at the applying ends thereof on ball-sockets 56. Shifting of the members 32 and 34 with the rotor causes counterclockwise movement of unit 10 on the anchor 14, thus applying the shoe portion thereof against surface 30 of the rotor. If members 32 and 34 should move relative to the friction unit 10, the camming devices 50 will cause further spreading of the friction members wedging them into tighter engagement with surfaces 22 and 24 of the rotor. It will be noted that vehicle movement in this direction is impeded by a combination of the retarding effort of friction members 32 and 34 and the shoe element 28 of unit 10.

Although this invention has been described in connection with only a single embodiment, it will be understood that various modifications will readily occur to those skilled in the art. Although only a single embodiment of the invention has been illustrated and described, various changes in the form and relative arrangements of the parts can be made to suit requirements and without departing from the principles of the invention.

I claim:

1. In a kinetic energy absorbing device, a U-shaped cross section rotor and two friction units each pivotally associated with an anchor member and each including axially-movable friction elements and a radially-actuated friction element applied by torque developed from engagement of said axially-movable friction elements with the rotor, a mechanically operated auxiliary brake applying mechanism for said device comprising two oppositely-acting friction members engageable with disk surfaces of the rotor, a mechanical linkage operatively connected to the friction members and including articulated levers pivotally connected intermediate the ends thereof, a ball-joint connection at the fulcrum of one of said levers permitting angular movement of said linkage, force transmitting means received through the ball-joint connection and connected to the other of said levers, a camming mechanism interconnecting said auxiliary applying mechanism and one of said units whereby shifting of the friction members causes pivotal movement of the friction unit connected therewith, said camming mechanism being further adapted to exert axially directed applying force on said friction members, and a force transmitting member interconnecting said units, said force transmitting member serving to translate pivotal movement of the one unit to apply a friction element of the other unit for inhibiting rotor rotation in one direction.

2. In a kinetic energy absorbing device, a U-shaped cross section rotor, a plurality of friction units, anchoring means pivotally locating said units, axially-movable friction elements reciprocably associated with each of said units, radially-actuated friction elements applied by pivotal movement of said units, and auxiliary brake applying means for said device comprising oppositely-acting friction members engageable with spaced apart sides of said rotor, a mechanical linkage for applying said members consisting of articulated levers for delivering thrust thereagainst, means for fulcruming said linkage, said fulcruming means being further adapted to permit angular movement of said linkage, a force applying element received through said means and attached to one of said levers for exerting applying effort thereon, a camming mechanism formed at the inter-connection of said auxiliary brake applying means and one of said friction units, said camming mechanism being arranged to force said members apart against the sides of the rotor and impart pivotal movement to the one unit as said members are caused to shift with the rotor, and a strut interconnecting said units whereby pivotal movement of the one unit transmits applying effort to the radially-actuated friction element of the other unit.

3. In a kinetic energy absorbing device a pair of friction units each pivotally associated with an anchor member and each of said units consisting of axially-movable and radially-applied friction elements, auxiliary applying means for said device comprising oppositely-acting friction members reciprocably associated with one of said units, a mechanical linkage for actuating said members, said linkage consisting of articulated levers fulcruming on and adapted for angular movement about the end of one of said levers, a flexible member received through the fulcrumed portion of said linkage and fastened to the other of said levers for actuating the auxiliary applying means, a camming device formed at the connection of said members and one of said units whereby shifting of the members produces pivotal movement of the one unit associated therewith, and a strut interconnecting said units to translate applying force to the other unit during a brake application in one direction of vehicle movement.

4. In a brake a pair of composite disk and shoe friction units and a mechanically-actuated auxiliary brake for said units comprising oppositely-acting friction members, articulated levers arranged to produce opposed movement of said friction members, said levers being pivoted about and fulcrumed on one of the ends thereof, a cam interconnection between said members and one of the units, means yieldably urging said members to released position, and a force transmitting member interconnecting said units to apply a portion of one of said units.

5. In a brake, a plurality of composite disk and shoe friction units, the shoe portions thereof being applied by pivotal movement of said units, a mechanically actuated device for applying said units, said device including oppositely acting friction members, means for applying said members, an interconnection between said device and one of said units, resilient means yieldably urging said member to released position, and a shiftable force transmitting member fastened between two of said units.

6. In combination with a rotor having an axis of rotation defining the center of the brake, an auxiliary brake for actuating a pair of composite disk and shoe brake units, said auxiliary brake comprising oppositely-applied friction members movable along a line parallel to the axis of rotor rotation into frictional engagement with said rotor, means for yieldably urging the friction members to a released position in disengagement with said rotor, and means interconnecting said auxiliary brake with one of said brake units.

7. An auxiliary brake in combination with a pair of composite disk and shoe brake units comprising oppositely-acting friction members, means for mechanically applying said friction members, a cam interconnecting said members and one of the brake units, and means means interconnecting said units whereby the friction members apply at least one of the shoe portions of said units during braking in either direction of vehicle motion.

8. A brake comprising a rotor and a friction unit in combination with said rotor and having an auxilliary brake applying mechanism, said friction unit comprising means for pivotally mounting said unit, a supporting member for said means, a fluid motor transversely received in said supporting member, a pair of oppositely-acting friction elements movable along a line parallel to the axis of rotation of said rotor and operatively associated with said fluid motor, a friction element carried by said supporting member and movable radially into frictional engagement with said rotor by pivotal movement of said entire unit, and a camming mechanism spaced from said fluid motor and connecting said unit with said auxiliary brake applying mechanism.

9. A friction unit and an auxiliary brake applying mechanism therefor, said unit comprising means for pivotally mounting said unit, a fluid motor, two spreadable friction elements operatively connected to said fluid motor for actuation thereby, a friction element movable transversely to the line of movement of said pair of friction elements and applied by pivotal movement of said unit, and a camming device interconnecting said auxiliary brake applying mechanism and friction unit to effect both applying movement of said auxiliary brake and engagement of said transversely movable friction element.

References Cited in the file of this patent

UNITED STATES PATENTS

| | | |
|---|---|---|
| 1,984,883 | La Brie | Dec. 18, 1934 |
| 1,998,533 | Brisson | Apr. 23, 1935 |
| 2,065,382 | Levy | Dec. 22, 1936 |
| 2,174,398 | Farmer | Sept. 26, 1939 |
| 2,292,017 | Smith | Aug. 14, 1942 |
| 2,372,319 | Francois | Mar. 27, 1945 |
| 2,387,039 | Parrett | Oct. 16, 1945 |
| 2,633,941 | Zindler | Apr. 7, 1953 |
| 2,737,265 | Cushman | Mar. 6, 1956 |
| 2,789,666 | Burnett | Apr. 23, 1957 |

FOREIGN PATENTS

| | | |
|---|---|---|
| 894,801 | France | Jan. 8, 1945 |